United States Patent [19]

Mathiesen et al.

[11] Patent Number: 5,219,479
[45] Date of Patent: Jun. 15, 1993

[54] SELF-EMULSIFYING ESTER COMPOUNDS

[75] Inventors: Thomas Mathiesen, Copenhagen; Jan W. Jensen, Albertslund, both of Denmark

[73] Assignee: Esti Chem A/S, Glostrup, Denmark

[21] Appl. No.: 689,754

[22] PCT Filed: Nov. 23, 1989

[86] PCT No.: PCT/DK89/00278

§ 371 Date: May 21, 1991

§ 102(e) Date: May 21, 1991

[87] PCT Pub. No.: WO90/05714

PCT Pub. Date: May 31, 1990

[30] Foreign Application Priority Data

Nov. 23, 1988 [DK] Denmark .............. 6534/88

[51] Int. Cl.$^5$ ............ C10M 105/42; C07C 69/003; C07C 69/33; C07C 69/58

[52] U.S. Cl. ................. 252/49.3; 252/49.5; 252/56 R; 560/190; 560/91; 560/198; 554/213; 554/218; 554/219; 554/223; 554/224; 554/227

[58] Field of Search ............. 252/49.3, 49.5, 56 R; 260/410.6; 560/190

[56] References Cited

U.S. PATENT DOCUMENTS

| | | | |
|---|---|---|---|
| 3,670,013 | 6/1972 | Leibfried | 260/488 |
| 4,313,890 | 2/1982 | Chu et al. | 260/410.6 |
| 4,317,780 | 3/1982 | Mancini et al. | 260/410.6 |
| 4,885,104 | 12/1989 | Sturwold | 252/49.3 |
| 4,957,641 | 9/1990 | Borggrefe et al. | 252/49.5 |
| 5,089,157 | 2/1992 | Trivett | 252/56 R |

FOREIGN PATENT DOCUMENTS

| | | |
|---|---|---|
| 100652 | 2/1984 | European Pat. Off. |
| 163806 | 12/1985 | European Pat. Off. |
| 52-151111 | 12/1977 | Japan |
| 59-133297 | 7/1984 | Japan |
| 59-164393 | 7/1984 | Japan |
| 1284512 | 8/1972 | United Kingdom |
| 1316606 | 5/1973 | United Kingdom |

OTHER PUBLICATIONS

Chemical Abstracts, vol. 92, No. 20, May 1980, p. 333.

Primary Examiner—Jacqueline V. Howard
Attorney, Agent, or Firm—Foley & Lardner

[57] ABSTRACT

Compounds of general formula (I), wherein $R^1$ is hydrogen, $C_{1-4}$ alkyl or a group of formula (II): —$O(CH(R^{10})CH_2O)_nR^{20}$, $R^2$ is hydrogen or a group of formula (III): —$O(CH(R^{11})CH_2O)_mR^{21}$, $R^3$ is a group of formula (IV): —$(CH(R^{12})CH_2O)_pR^{22}$, and $R^4$ is a group of formula (V): —$(CH(R^{13})CH_2O)_rR^{23}$, where $R^{10}$, $R^{11}$, $R^{12}$ and $R^{13}$ each is hydrogen or $CH_3$, $R^{20}$, $R^{21}$, $R^{22}$ and $R^{23}$ each is an acyl moiety of a polycarboxylic acid, and n, m, p and r each is an integer from 1 to 15; q is 1 or 2; with the provisos that if q is 2, then the 2 groups $R^1$ may be the same or different and the 2 groups $R^2$ may be the same or different; and, if one or more of the groups $R^{20}$, $R^{21}$, $R^{22}$, and $R^{23}$ is an acyl moiety of a polycarboxylic acid group, then 0-3 of the remaining carboxy groups of the polycarboxylic acid form the acyl function(s) of a moiety $R^{20}$, $R^{21}$, $R^{22}$, and $R^{23}$ in another unit of formula (I); and at least one of any free carboxylic acid groups are neutralized, as well as compositions comprising compounds of formula (I) and an additive, and aqueous emulsions of such compounds or compositions. The compounds of formula (I) are useful as self-emulsifying compounds, as cooling/lubricating agents in the machining of metals, in hydraulic fluids, and as mould release agents.

26 Claims, No Drawings

SELF-EMULSIFYING ESTER COMPOUNDS

FIELD OF THE INVENTION

The present invention relates to ester compounds having self-emulsifying properties and which are useful in aqueous cooling and lubricating agents for machining in particular metal items.

DESCRIPTION OF THE PRIOR ART

In machining operations of in particular metals, e.g. turning, grinding, milling and drilling operations, mineral oils have traditionally been used as lubricating agents. This has caused a number of problems due to the resulting oil smoke and oil aerosols and inadequate cooling. These problems have to some extent been reduced through the increasing use of mineral oil emulsions. However, such emulsions have not solved the environmental problem aspects of the use of lubricating agents for the machining of metals.

Mineral oils as well as emulsions thereof have a number of drawbacks such as limited lubricating ability which necessitates the addition of various additives. Typical examples of such additives are corrosion inhibitors, biocides, lubrication improving additives, VI-improvers (viscosity index improvers) and, in case of emulsions, emulsifiers. A number of these additives can, just like mineral oil itself, cause skin irritations or irritation of the air passage.

In later years, it has been attempted to solve the work environmental problems surrounding in particular cooling/lubricating agents by using either pure synthetic oils or by using mixtures of mineral and synthetic oils. Such measures have to some extent reduced the need for the incorporation of additives. The synthetic oils employed are often derivatives of various monocarboxylic acids, mostly fatty acids.

However, there is still a profound need for lubricating agents that on the one hand improves the indoor environment and on the other hand causes less of a stress on the external environment. It is well known that the biodegradability of mineral oils is very inferior. The transition to ester-based base components improved this property. At the same time, the lubricating agent must provide metal items having the decided surface characteristics, appearance and tolerances. Furthermore, the wear of cutting tools should not be increased but should desirably be reduced due to improved lubricating ability.

The present invention fulfills the above described needs in a surprising manner in that it provides novel compounds that may be used as a component in an aqueous lubricating agent for use in particular in the machining of metals.

SUMMARY OF THE INVENTION

In one aspect, the invention concerns compounds of the general formula I

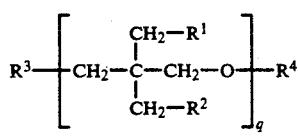

wherein
$R^1$ is hydrogen, $C_{1-4}$ alkyl or a group of the formula II $$-O(CH(R^{10})CH_2O)_n R^{20} \quad \text{II}$$

where $R^{10}$ is hydrogen or $CH_3$, $R^{20}$ is hydrogen or an acyl moiety of a mono- or polycarboxylic acid, and n is an integer from 0 to 15;
$R^2$ is hydrogen or a group of the formula III $$-O(CH(R^{11})CH_2O)_m R^{21} \quad \text{III}$$

where $R^{11}$ is hydrogen or $CH_3$, $R^{21}$ is hydrogen or an acyl moiety of a mono- or polycarboxylic acid, and m is an integer from 0 to 15;
$R^3$ is a group of the formula IV $$-O(CH(R^{12})CH_2O)_p R^{22} \quad \text{IV}$$

where $R^{12}$ is hydrogen or $CH_3$, $R^{22}$ is hydrogen or an acyl moiety of a mono- or polycarboxylic acid, and p is an integer from 0 to 15; and
$R^4$ is a group of the formula V $$-(CH(R^{13})CH_2O)_r R^{23} \quad \text{V}$$

where $R^{13}$ is hydrogen or $CH_3$, $R^{23}$ is an acyl moiety of a polycarboxylic acid, and r is an integer from 1 to 15;
q is 1 or 2;
with the proviso that if q is 2, then the 2 groups $R^1$ may be the same or different and the 2 groups $R^2$ may be the same or different;
and, if one or more of the groups $R^{20}$, $R^{21}$, $R^{22}$, and $R^{23}$ is an acyl moiety of a polycarboxylic acid group, then 0-3 of the remaining carboxy groups of the polycarboxylic acid form the acyl function(s) of a moiety $R^{20}$, $R^{21}$, $R^{22}$, and $R^{23}$ in another unit of the formula I;
and at least one of any free carboxylic acid groups are neutralized.

Contrary to most of the previously used synthetic oils, compounds of the formula I have self-emulsifying properties, and are able to form highly homogeneous, stable, transparent microemulsions. Such emulsions have exhibited surprisingly superior cooling and lubricating properties during metal machining operations.

Consequently, the invention also concerns compositions consisting of one or more compounds of the formula I as defined above in combination with one or more additives; and aqueous emulsion of one or more compounds of the formula I or of a composition containing such compounds; as well as the use of such compounds, compositions or emulsions as cooling and lubricating agents in the machining of metal items.

DETAILED DESCRIPTION OF THE INVENTION

In the present context, the term "$C_{1-4}$ alkyl" means a straight or branched saturated hydrocarbon radical with 1 to 4 carbon atoms such as methyl, ethyl, n-propyl, i-propyl, n-butyl, i-butyl, sec.butyl and tert.butyl.

The term "an acyl moiety of a mono- or polycarboxylic acid" is intended to mean the acyl radical of any organic carboxylic acid having one or more carboxy groups, preferably an aliphatic, alicyclic or carboaromatic mono- or polycarboxylic acid, the polycarboxylic acid preferably having from 2 to 4 carboxy groups.

In the compounds of the invention, the polyglycol functions connected to the central polyol function via ether bonds are to a considerable extent responsible for the self-emulsifying properties of the compounds of formula I. It is preferred that the variables n, m, p or r are in the range from 1 to 10, in particular from 1 to 7.

An acyl moiety of a monocarboxylic acid may be the acyl moiety of a monocarboxylic acid selected from the group consisting of $C_{1-24}$ alkanoic acids, optionally substituted with 1 or 2 hydroxy groups, $C_{3-24}$ alkenoic acids, optionally substituted with 1 or 2 hydroxy groups, $C_{5-24}$ alkadienoic acids, optionally substituted with 1 or 2 hydroxy groups and aryl carboxylic acids where the aryl moiety may be substituted with hydroxy or $C_{1-4}$ alkyl. The aryl moiety may be a benzene or naphthalene nucleus or may be 2 benzene or naphthalene nuclei connected with one another such as biphenyl or perylene.

Examples of such monocarboxylic acids from which the acyl moiety is derived are valeric acid, hexanoic acid, heptanoic acid, caprylic acid, pelargic acid, capric acid, undecanoic acid, lauric acid, tridecanoic acid, myristic acid, pentadecanoic acid, palmitic acid, heptadecanoic acid, stearic acid, nonadecanoic acid, arachidic acid, heneicosanoic acid, behenic acid, lignoceric acid, 9C-dodecenoic acid, 9C-tetradecenoic acid, 9C-hexadecenoic acid, 6C-octadecenoic acid, oleic acid, ricinoleic acid, linoleic acid, linolenic acid and analogues thereof, 2-ethyl-butanoic acid, 2-ethyl-hexanoic acid, isoheptanoic acid (mixtures of isomers, primarily α-branched structure), isooctanoic acid (mixture of isomers, primarily dimethylhexanoic acid), isononanoic acid (3,5,5-trimethyl-hexanoic acid), isodecanoic acid (mixture of isomers, primarily dimethyl-octanoic acid), isopalmitic acid (mixture of isomers, primarily 2-hexyl-decanoic acid), isostearic acid (mixture of isomers, primarily 2-octyldecanoic acid and/or 2-ethyl-hexadecanoic acid), neopentanoic acid (mixture of isomers, primarily 2,2-dimethyl-propionic acid, neooctanoic acid (mixture of isomers), benzoic acid, substituted benzoic acids and analogues thereof.

An acyl moiety of a polycarboxylic acid is preferably an acyl moiety of a polycarboxylic acid having 2–4 carboxy groups.

In particular, the polycarboxylic acid is selected from the group consisting of $C_{2-20}$ alkanedioic acids optionally substituted with 1 or 2 hydroxy groups, $C_{4-20}$ alkanedioic acids, optionally substituted with 1 or 2 hydroxy groups, $C_{6-20}$ alkadienedioic acids, optionally substituted with 1 or 2 hydroxy groups, $C_{6-20}$ alkanetrioic acids optionally substituted with 1 or 2 hydroxy groups, aryldicarboxylic acids, aryltricarboxylic acids, aryltetracarboxylic acids, and di- or trimeric fatty acids produced by polymerization of unsaturated fatty acids with 8–20 carbon atoms, preferably 16–18 carbon atoms.

Examples of such polycarboxylic acids are oxalic acid, malonic acid, succinic acid, glutaric acid, adipic acid, pimelic acid, suberic acid, azelaic acid, sebacic acid, 1,12-dodecanedioic acid and analogues thereof; maleic acid, fumaric acid and analogues thereof; citric acid, tartaric acid, malic acid and analogues thereof; trimethyladipic acid or dodecenylsuccinic acid, and analogues thereof; o-, m- and p-phthalic acid, trimellitic acid, trimesic acid, pyromellitic acid, perylene- dicarboxylic acids such as 3,9-perylene-dicarboxylic acid, perylene-tetracarboxylic acids such as 3,4,9,10-perylene-tetracarboxylic acid and analogues thereof as well as polymerized fatty acids, in particular in the form of dimeric and trimeric fatty acids being polymerisates of fatty acids of natural origin such as rapeseed oil fatty acids or tall-oil fatty acids, e.g. dimeric oleic acid, dimeric linoleic acid, dimeric linolenic acid as well as trimers of these acids and analogues thereof.

It will be clear that if one or more groups $R^{20}$, $R^{21}$, $R^{22}$ or $R^{23}$ is an acyl moiety of a polycarboxylic acid, one or more carboxylic acid groups will be free since only one carboxylic acid group is employed in the ester link to the remainder of the compound of formula I. It is preferred that such free carboxylic acid groups are neutralized with a base, in particular an alkaline or alkaline earth metal hydroxide or carbonate, ammonia or an organic amine. Examples of such bases are lithium hydroxide, sodium hydroxide, potassium hydroxide, potassium carbonate and bicarbonate, sodium carbonate and bicarbonate; ammonia; monoalkylamines such as ethylamine, iso- or n-propylamine, butylamine and analogues thereof; dialkylamines such as diethylamine, diisopropylamine, di-n-propylamine, dibutylamine, methylethylamine, ethylbutylamine, dimethylisopropylamine and analogues thereof; trialkylamines such as triethylamine, triisopropylamine, tri-n-propylamine, tributylamine and analogues thereof; alkanolamines such as monoethanolamine, diethanolamine, triethanolamine, monoisopropanolamine, diisopropanolamine, triisopropanolamine, diethylamineethanol, methylethanolamine, n-propylethanolamine, butylethanolamine and analogues thereof; alkoxyalkylamines such as di-2-methoxyethylamine, 3-ethoxypropylamine, 3-(2-ethylhexoxy)-propylamine and analogues thereof; cycloaliphatic amines such as cyclohexylamine, dimethylcyclohexylamine, N-ethyl-cyclohexylamine and analogues thereof; aromatic amines such as aniline, dimethylaniline, toluidine, ethyltoluidine, naphthylamine and analogues thereof; polyamines such as ethylenediamine, 1,2-propylenediamine, 1,3-diaminopropane, 3-amino-1-cyclohexylaminopropane, hexamethylenediamine, triethylenediamine, diethylenetriamine, and analogues thereof; heterocyclic amines such as morpholine and analogues thereof. Also, mixtures of the above can be used.

Preferred compounds of the invention are compounds in which

1) $R^1$ and $R^2$ are both hydrogen,
2) $R^1$ is methyl and $R^2$ is the group of the formula III, or
3) $R^1$ is a group of the formula II and $R^2$ is a group of the formula III.

Thus, the preferred polyol moiety of the compounds in the invention is neopentylglycol, trimethylolpropane and pentaerythritol as well as homogeneous or mixed dimers thereof. Examples of such dimers are di-trimethylolpropane, and di-pentaerythritol.

In a preferred embodiment of the invention, $n+m+p+r$ is an integer in the range from 3 to 25.

One interesting class of compounds of the formula I are those in which n, m, p, and r each are 1–3, in which one or more of $R^{20}$, $R^{21}$, and $R^{22}$ (to the extent they are present depending on the meanings of $R^1$, $R^2$, and $R^3$) are acyl moieties of one of the long-chain (e.g. 10–25 carbon atoms) monocarboxylic fatty acids among those listed above such as stearic or oleic acid, and in which $R^{23}$ is the acyl moiety of a medium or short-chain (3–8 carbon atoms) dicarboxylic acid such as succinic or adipic acid, the free carboxy group being neutralised with e.g. an amine. Such compounds exhibit advantageous properties with regard to self-emulsification.

Another interesting class of compounds are those in which $R^{23}$ is a dicarboxylic acid other carboxy group of which forms the acyl moiety of another unit of the formula I. Thus, $R^{23}$ could have the formula X

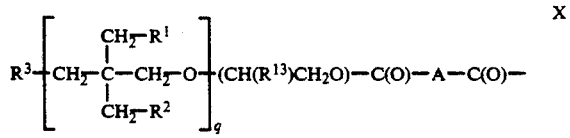

$$R^3 \!-\!\!\left[\text{CH}_2\!-\!\!\underset{\underset{\text{CH}_2\!-\!R^2}{|}}{\overset{\overset{\text{CH}_2\!-\!R^1}{|}}{C}}\!-\!\text{CH}_2\!-\!\text{O}\right]_{\!q}\!\!\!-\!(\text{CH}(R^{13})\text{CH}_2\text{O})\!-\!\text{C(O)}\!-\!\text{A}\!-\!\text{C(O)}\!-\quad\text{X}$$

in which —C(O)—A—C(O)— is the diacyl moiety of a dicarboxylic acid. The dicarboxylic acid may be any of the ones listed above such as succinic or adipic acid. In a particularly interesting embodiment, the dicarboxylic acid moiety may incorporate a long-chain hydrocarbon substituent in its structure (e.g. dodecenyl-succinic acid or analogues thereof) since such compounds exhibit useful solubility in paraffins while at the same time having good emulsifying properties, thereby being suitable for the preparation of self-emulsifying cutting oil concentrates containing paraffins.

The principle of linking units of the formula I by means of polycarboxylic acids can be continued so that 3, 4, 5, 6, or more units are linked in a chain by e.g. dicarboxylic acid moieties. As it will be evident from example 16, such compounds exhibit interesting thickening properties in aqueous solution. Such compounds are also comprised by the present invention.

The compounds of the invention may be prepared by reacting a compound of the formula I where $R^1$, $R^2$, $R^3$, $R^4$, $R^{10}$, $R^{11}$, $R^{12}$, $R^{13}$, n, m, p, r, and q are as defined above and $R^{20}$, $R^{21}$, $R^{22}$ and $R^{23}$, when present, are all hydrogen, with an acid or acids or derivatives thereof having an acyl moiety corresponding to the desired acyl moieties $R^{20}$, $R^{21}$, $R^{22}$ and/or $R^{23}$. If the carboxylic acid is used in free form, a conventional esterification catalyst such as a strong acid or an organic zinc, tin, or titanium compound such as dibutyltin oxide or a titaniumalkoxylate may be present, or the reaction may be carried out under conditions where the water generated in the esterification reaction is removed. However, activated acid derivatives such as acid halogenides, e.g. chlorides or bromides, anhydrides or activated esters may also be used.

The reaction may be carried out in the presence or absence of a solvent. If a solvent is used, and the reaction is carried out under conditions where the water generated in the esterification reaction is to be removed, the solvent is preferably a solvent which forms an azeotrope with water in order to assist in the removal of the water. Examples of such solvents are benzene, toluene or, in particular, a xylene. The reaction is generally carried out at high temperature such as between 150° C. and 270° C., in particular when water is removed azeotropically. The reaction time may be from 1 to 10 hours or until the acid number of the reaction mixture indicates that a conversion of at least 80%, preferably at least 90% of the reactants has been obtained.

If one of the groups $R^{20}$, $R^{21}$, $R^{22}$ or $R^{23}$ is a polycarboxylic acid where one of the remaining carboxy groups form the acyl function of a moiety $R^{20}$, $R^{21}$, $R^{22}$ and $R^{23}$ connected to another unit of the formula I, the reaction can be carried out in two steps starting with esterification of the monocarboxylic acid or acids in the manner described above followed by reaction with the polycarboxylic acid which may be present as the acid itself or as an acid halogenide or an activated ester of the halogenide. The reaction with the polycarboxylic acid may take place simultaneously with the reaction with the monocarboxylic acid(s).

The use of an internal anhydride of a polycarboxylic acid is particularly useful for the preparation of compounds of the formula I, where the remaining carboxylic groups are free. In this case, the reaction is usually carried out at a temperature in the range of 120°-180° C.

Following the reaction, any free carboxylic acid groups as well as any minor amounts of unreacted carboxylic acid is neutralized with the neutralizing agents described above.

The starting compounds of formula I where $R^1$, $R^2$, $R^3$, $R^4$, $R^{10}$, $R^{11}$, $R^{12}$, $R^{13}$, n, m, p, r and q are as defined above, and $R^{20}$, $R^{21}$, $R^{22}$ and $R^{23}$, when present, are all hydrogen, are known and available commercially, or may be obtained in a manner analogous to the known compounds by reacting the corresponding compound where n, m, p and r are all 0 with a suitable amount of ethylene oxide or propylene oxide, the used number of equivalents of ethylene oxide or propylene oxide per mole of starting polyol corresponding to the sum n+m+p+r in the required alkoxylated intermediary compound. The reaction with ethylene oxide or propylene oxide may be carried out in a manner known per se.

As indicated above, another aspect of the invention is a composition consisting of one or more compounds of the formula I as defined above and one or more additives.

One type of additives is corrosion inhibitors, although the compounds of the invention themselves possess corrosion inhibiting properties. These materials are added in order to prevent corrosion on the machining equipment such as lathes during the machining operations. The corrosion inhibitors may be any one of the corrosion inhibitors normally used in the known cooling/lubricating agents consisting of mineral oil emulsions, e.g. benzotriazoles, tolutriazoles, alkyl esters of aromatic sulphonic acids etc. The corrosion inhibitors are used in the compositions according to the invention in amounts that will provide the desired corrosion inhibiting effects in the final use form, the exact amount depending on the type of corrosion inhibitor used and the manufacturers' recommendations.

Another type of additive is certain oily hydrophobic components, the primary task of which is to act as an "emulsification core" for certain of the compounds of the invention. The principle is that some compounds of the invention emulsify better if they are present together with a hydrophobic compound which serves as a lipophilic phase around which the molecules of the compounds of the invention order themselves. Another advantage of such compounds is that they provide good wetting of a metal surface by creating a film of the compound on the surface. Examples of such hydrophobic compounds are lower alkyl esters of long-chain fatty acids, e.g. butyl oleate and 2-ethyl-hexyl stearate. Another possible type of oily hydrophobic component is mineral oils which are a cheap alternative to e.g. fatty acid esters but are less preferred than the esters because of the higher health risk. The hydrophobic compounds may be present in the composition to the invention in very varying amounts varying from 5 to over 100% by weight calculated on the compound(s) of formula I.

Another type of additives are biocides which are used to prevent growth of microorganisms in emulsions prepared from the compositions of the invention. The biocides may be any of the biocides commonly used in cooling/lubricating emulsion compositions such as biocides based on phenolic compounds, quarternary ammonium compounds, aldehyde-releasing compounds or compounds based on thymol or analogous thereof. A number of such biocides are available commercially, e.g. from Bayer, West Germany, under the trade name of "Preventol". The biocides are employed in amounts that will provide the desired biocidic effects in the final use form as an emulsion, the exact amount depending on the type of biocide used and the manufacturer's recommendations.

Yet another type of additive is anti-wear or AW-agents. These AW-agents may be any of those commonly used in cooling/lubricating compositions and examples thereof are dialkyldithiophosphate-metal complexes where the metal is zinc, lead, molybdenum or antimony. Such compounds are available e.g. from Bayer, West Germany under the tradename of "Additin".

A further type of additive is extreme pressure or EP-agents, the purpose of which are to react chemically with the metal surface and form a protective film which prevents direct metal-to-metal contact and thereby reduces wear. The EP-agents employed may be any of those commonly used in cooling/lubricating compositions and are typically various polysulphur compounds. Typical EP-agents are available from e.g. Bayer, West Germany under the tradename of "Additin".

The amount of AW- or EP-agent employed in the composition will vary according to the type of EP-agent used and the manufacturers' recommendations.

Yet another aspect of the invention is an aqueous emulsion of one or more compounds of the formula I as defined above or of a composition as defined above. The total content of the compound or compounds of the formula I is preferably in the range from 0.1 to 90% by weight, in particular in the range from 0.5 to 50% by weight, especially in the range from 1.0 to 35% by weight, such as in the range from 1.0 to 20% by weight.

Due to the self-emulsifying properties of the compounds of the formula I such emulsions are easy to form. The compounds of the invention are capable of forming extremely stable microemulsions very easily without the need of resorting to the use of homogenizers and the like. Thus, emulsions of the invention are typically prepared by heating one or more compounds of the invention or a composition of the invention to a slightly elevated temperature, such as 40°-60° C. and slowly adding the heated compound/compounds or composition to a suitable amount of water held at a similar temperature while stirring.

The emulsions of the invention may exist both as emulsion concentrates with amounts of composition of the formula I in the higher parts of the ranges indicated above and also ready-to-use emulsions where the amount of compound or compounds of formula I is in the lower parts of the above-described ranges. Thus, an emulsion concentrate may contain 40% or more, such as 50–60%, by weight of compounds of formula I whereas an emulsion ready to use as a lubricating/cooling emulsion may contain as little as 6–10% by weight of compound or compounds of formula I. The amount of compound or compounds of formula I in the emulsion to be used for machining operations will, of course, depend on a number of factors such as the type of machining operation involved (turning, milling, thread-cutting etc.), the type of material to be machined (e.g. plastics or metals or metal alloys such as mild steel, stainless steel, brass, titanium etc.) as well as the requirements to the surface characteristics of the finished, machined item. However, the content ranges indicated above are typical and can be applied in many cases.

As a consequence of the above indicated characteristics, the invention also concerns a method of cooling and lubricating a metal or plastic item during a machining operation comprising applying to a machining side of said item during said machining operation a compound of the formula I as defined above, a composition as defined above and/or an emulsion as defined above; as well as the use of a compound of the formula I as defined above, a composition as defined above or an emulsion as defined above as a cooling and lubricating agent in the machining of the metal or plastic items.

Due to the self-emulsifying and lubricating properties of the compounds of formula I, the invention also concerns a method of transmitting hydraulic pressure through a hydraulic conduit by means of a hydraulic transmission fluid contained in said conduit where said hydraulic transmission fluid is a compound of the formula I as defined above, a composition as defined above and/or, in particular, an emulsion as defined above; as well as the use of a compound of the formula I as defined above, a composition as defined above or, in particular, an emulsion as defined above, as a hydraulic transmission fluid. Another type of oily hydrophobic components are mineral oils which are a cheap alternative to e.g. fatty acid esters. But by introducing mineral oils, the health risk must be considered as higher, compared to products containing esters. The emulsions of the invention, in particular, may be useful in this respect, for example for use in hydraulic machinery employed in such locations as underground drilling sites where aerosols of conventional hydraulic oils are undesirable due to the danger of explosions ignited by sparks from drilling or similar equipment. A formulation can, regarding additives, follow the guidelines mentioned earlier. But it will also typically contain mono- or oligoglycols. The formulation might include non-ionic surfactants which in combination with compounds of the formula I act as thickeners. A waterbased hydraulic fluid which confirms the ISO VG 46-standard can be as follows:

| | |
|---|---|
| Compound of the formula I: | 15–20 pct (depending on additives) |
| Propyleneglycol: | 20 pct |
| Additives: | 5–10 pct |
| Demineralized water: | 50–55 pct |

Also, the compounds of the invention are contemplated as being useful in the casting field. Consequently, the invention also concerns a method of casting an item from a castable material in a mould wherein a mould release agent is introduced into said mould prior to the introduction of said castable material into said mould, the mould releasing agent being a compound of the formula I as defined above, a composition as defined above and/or an emulsion as defined above. Conversely, the invention further concerns the use of a compound of the formula I as defined above, a composition as defined above or an emulsion as defined above as a mould release agent. The castable material may be a metal such as aluminium or a plastic such as polyurethane foam. Thus, an emulsion according to the invention may be very useful in connection with the casting of aluminium in that the aqueous phase serves to cool the mould after a casting operation, thereby depositing a film of compound(s) of the formula I which then serves as a mould release agent in the subsequent casting operation. Release agents for die casting of aluminium are normally oil-inwater emulsions based on silicone-emulsions, emulsified wax (natural or synthetic) and additives, such as emulsifiers, graphite etc. Use-concentrations typically are as low as 0.1–0.5 pct solids in water. Products containing compounds of the formula I has proven to be superior to traditional products based on silicone-emulsions and/or emulsified waxes. The products based on compounds of the formula I seem to improve the look of the surface of the finished materials and form less build-up in the dies. Some testing has shown the possibility of reducing user-concentration.

Products containing compounds of the formula I have been used as well as release agents for polyurethane systems, again with excellent results.

The invention is further illustrated in the following non-limiting examples.

EXAMPLE 1

A 1 liter 3-necked flask equipped with a mechanical stirrer, a thermometer, a Dean-Stark water separating device and inlet for inert gas nitrogen was charged with 266 g (1 mole) ethoxylated trimethylol propane (TMP) (3 moles ethylene oxide per mole TMP), 282 g (1 mole) oleic acid and 27 g xylene. The xylene was added for the purpose of azeotropic distillation of water formed during the reaction. Under a nitrogen atmosphere, the temperature was raised to the final reaction temperature of 240° C. under formation of water. After the acid number had fallen to below 8 mg KOH/g, the remaining xylene was distilled off in vacuum. Following cooling to app. 150° C., 100 g (1 mole) succinic acid anhydride was added whereby the temperature fell to 125° C. The temperature was again raised to 150° C. and held there for 30 minutes.

The raw product was a thick oil at 20° C. with an acid number of app. 75 mg KOH/g. The acid number was neutralized with 20,9 g triethanolamine per 100 g raw product (5% excess). The final product was a light brown viscous oil at 20° C.

EXAMPLE 2

A 1 liter 3-necked flask equipped with a mechanical stirrer, a thermometer, a Dean-Stark water separating device and inlet for inert gas was charged with 266 g (1 mole) ethoxylated trimethylol propane (TMP) (3 moles ethylene oxide per mole TMP), 282 g (1 mole) oleic acid and 27 g xylene. The temperature was raised to the final reaction temperature of 240° C. under nitrogen. After the acid number had fallen to below 8 mg KOH/g, the remaining xylene was distilled off in vacuum. Following cooling to app. 150° C., 148 g (1 mole) phthalic acid anhydride was added. The temperature was raised to 150°–160° C. and held there for 30 minutes.

The raw product was a thick oil with an acid number of app. 85 mg KOH/g. The acid number was neutralized with 23.7 g triethanolamine per 100 g raw product (5% excess). The final product was a light brown viscous oil at 20° C.

EXAMPLE 3

A 2 liter 3-necked flask equipped with a mechanical stirrer, a thermometer, a Dean-Stark water separating device and inlet for inert gas was charged with 507 g (0.5 mole) ethoxylated trimethylol propane (TMP) (20 moles ethylene oxide per mole TMP), 282 g (1 mole) oleic acid and 40 g xylene. The temperature was raised to the final reaction temperature of 240° C. under nitrogen. After the acid number had fallen to below 8 mg KOH/g, the remaining xylene was distilled off in vacuum.

The raw product was an oil at 20° C. with an acid number of app. 7.0 mg KOH/g. The acid number was neutralized with 2.0 g triethanolamine per 100 g raw product (5% excess). The final product was a light brown oil at 20° C.

EXAMPLE 4

A 2 liter 3-necked flask equipped with a mechanical stirrer, a thermometer, a Dean-Stark water separating device and inlet for inert gas was charged with 507 g (0.5 mole) ethoxylated trimethylol propane (TMP) (20 moles ethylene oxide per mole TMP), 36.5 g (0.25 mole) adipic acid, 176,25 g (0,625 mole) oleic acid and 36 g xylene. The temperature was raised to the final reaction temperature of 245° C. After the acid number had fallen to below 12 mg KOH/g, the remaining xylene was distilled off in vacuum.

The raw product was a thick oil at 20° C. with an acid number of app. 11.0 mg KOH/g. The acid number was neutralized with 3.1 g triethanolamine per 100 g raw product (5% excess). The final product was a light brown, slightly cloudy viscous oil at 20° C. This product consists of two units of ethoxylated trimethylol propane (20 units ethylene oxide per unit TMP) linked by means of an adipic acid unit and where the majority of the remaining alcohol functions are esterified with oleic acid.

EXAMPLE 5

A 2 liter 3-necked flask equipped with mechanical stirrer, a thermometer, a Dean-Stark water separating device and inlet for inert gas was charged with 507 g (0.5 mole) of ethoxylated trimethylolpropane (TMP) (20 moles of ethylene oxide per mole TMP), 66.5 g (0.25 mole) of dodecenyl succinic anhydride, 176.25 g (0.625 mole) of oleic acid and 36 g of xylene. The temperature was raised to the final reaction temperature of 245° C. After the acid number had fallen to below 12 mg of KOH/g, the remaining xylene was distilled off in vacuum.

The raw product was a thick oil at 20° C. with an acid number of approximately 11.0 mg of KOH/g. The acid number was neutralized with 3.1 g of triethanolamine per 100 g of raw product (5% excess). The final product was a light brown, viscous oil at 20° C.

EXAMPLE 6

A 2 liter 3-necked flask equipped with mechanical stirrer, a thermometer, a Dean-Stark water separating device and inlet for inert gas was charged with 507 g (0.5 mole) of ethoxylated trimethylolpropane (TMP) (20 moles of ethylene oxide per mole TMP), 48.6 g (0.333 mole) of adipic acid, 164.4 g (0.583 mole) of oleic acid and 36 g of xylene. The temperature was raised to the final reaction temperature of 245° C. After the acid number had fallen to below 12 mg of KOH/g, the remaining xylene was distilled off in vacuum.

The raw product was a thick oil at 20° C. with an acid number of approximately 11.0 mg of KOH/g. The acid number was neutralized with 3.1 g of triethanolamine per 100 g of raw product (5% excess). The final product was a light brown, slightly cloudy viscous oil at 20° C. This product consists of three units of ethoxylated trimethylolpropane (20 units of ethylene oxide per unit of TMP) linked by means of two adipic acid units and where the majority of the remaining alcohol functions are esterified with oleic acid.

EXAMPLE 7

A 1 liter 3-necked flask equipped with a mechanical stirrer, a thermometer, a Dean-Stark water separating device and inlet for inert gas was charged with 308 g (1 mole) of propoxylated trimethylolpropane (TMP) (3 moles of propylene oxide per unit of TMP), 282 g (1 mole) of oleic acid, and 27 g of xylene. The temperature was raised to the final reaction temperature of 240° C. After the acid number had fallen to below 8 mg of KOH/g, the remaining xylene was distilled off in vacuum. After cooling to approximately 150° C., 100 g (1 mole) of succinic anhydride was added whereby the temperature fell to 125° C. The temperature was again raised to 150° C. and kept there for 30 minutes.

The raw product was a thick oil at 20° C. with an acid number of approximately 74 mg of KOH/g. The acid number was neutralized with 20.6 g of triethanolamine per 100 g of raw product (5% excess). The final product was a light brown, viscous oil at 20° C. This product is an example of a product based on propoxylated TMP.

EXAMPLE 8

14 g of the product prepared according to example 1, 12 g of the product prepared according to example 4 and 14 g butyl oleate was mixed. The mixture was heated to app. 50° C. and slowly added to 60 g water at app. 50° C. while stirring with a magnetic stirrer whereby a semitransparent emulsion concentrate was obtained. Dilution of the concentrate with from five to ten times the amount of water gave an emulsion exhibiting excellent properties as a cooling/lubricating agent in metal machining operations such as turning and drilling. Thus, the diluted emulsion made it possible to turn items made from titanium alloys.

EXAMPLE 9

18 g of the product prepared according to example 3, 20 g butyl oleate and 2 g ethoxylated isotridecanol (3 moles ethylene oxide per mole isotridecanol) was mixed and thereafter emulsified in 60 g water. Thereby a semitransparent, stable emulsion concentrate was obtained. A dilution thereof from five to ten times with water had excellent properties for use as e.g. a grinding fluid.

EXAMPLE 10

20 g of the product prepared according to example 4 was emulsified in 80 g water in the same manner as in example 8 whereby a transparent stable emulsion was obtained. This emulsion had excellent properties as a cutting fluid during slow machining operations such as the cutting of threads.

EXAMPLE 11

2 water-dilutable cutting fluids based on compounds of the formula I were tested in tapping and reaming operations on aluminium objects. The results were compared with testing results of a 100% mineral oil based cutting oil and a commercial cutting fluid.

Cutting fluids

1. KS1, a fully synthetic cutting fluid based on compounds of the formula I and fatty acid esters. The fluid is diluted to 5% solids with water before use.
2. KS2, a semi-synthetic cutting fluid containing mineral oil and compounds of the formula I. The fluid is diluted to 5% solids with water before use.
3. KS4, a commercial water-dilutable cutting fluid (experimental product based on ethyleneglycol-propyleneglycol copolymers, molecular weight 1000-2000). The fluid is diluted to 5% solids with water before use.
4. DORTAN 51 (Exxon), mineral oil with chlorinated paraffins (24% Cl). Viscosity: 10.7 cST/40° C. The oil is not diluted before use.

Formulations of KS1 and KS2 concentrates are listed below.

| Formulations of KS1 and KS2 cutting fluids | | |
| --- | --- | --- |
| | | % |
| Formulation KS1 | | |
| 1. Product from example 1 | | 34.8 |
| 2. Product from example 4 | | 26.2 |
| 3. ESTIPLAST MFE 312 | (f) | 34.8 |
| 4. Preventol ON Extra | (d) | 2.0 |
| 5. Preventol CI-7-50 | (e) | 2.2 |
| | | 100.0 |
| Formulation KS2 | | |
| 1. 19 cSt mineral oil | (a) | 36.9 |
| 2. Product from example 1 | | 32.3 |
| 3. Product from example 5 | | 4.6 |
| 4. ESTISURF 700 | (b) | 18.4 |
| 5. Degressal SD 40 | (c| | 3.7 |
| 6. Dem. water | | 2.8 |
| 7. Preventol ON Extra | (d) | 0.9 |
| 8. Preventol CI-7-50 | (e) | 0.4 |
| | | 100.0 |

(a) Puccini 19P, Kuwait Petroleum
(b) Non-ionic, PEG-based emulsifier, Esti Kemi, Denmark
(c) Phosphate-based anti-foaming agent, BASF
(d) Preservative, o-phenylphenol, Bayer
(e) Copper passivator, tolutriazol-Na-salt, Bayer
(f) 2-Ethyl-hexyl laurate, Esti Kemi, Denmark

Materials

Aluminium 2S (technical aluminium, annealed)
Cylinders: 30×29 mm with 10.5 mm hole.

Operations

The test focusses on the lubricating properties of the fluids by carrying out two operations with high demands to lubricating power:

1. Tapping Torque Test. The tapping torque was measured with two different taps with straight or twisted cutting edges. The results are given below in Nm.
2. Reaming Torque Force Test. Two different reamers with straight and twisted cutting edges are used. Reaming force results are given below in N, reaming torque in Nm. Surface roughness is measured according to ISO 4287 standard. Results are given below in μm.

Each test is repeated 6 times.

| RESULTS | | |
|---|---|---|
| | Straight cutting edge | Twisted cutting edge |
| TAPPING TORQUE (Nm) | | |
| Dortran 51 | 5 | 5–7 |
| KS2 | 7–8 | 7–10 |
| KS4 | 10–20 | 7–17 |
| REAMING | | |
| Reaming force (N) | | |
| Dortran 51 | 50–68 | 20–22 |
| KS1 | 80–90 | 20–30 |
| KS2 | 125–140 | 25–30 |
| KS4 | 100–200 | 25–30 |
| Reaming torque (Nm) | | |
| Dortran 51 | 0.9–1 | 0.5 |
| KS1 | 1.1–1.2 | 0.6–0.7 |
| KS2 | 1.3–1.4 | 0.6–0.7 |
| KS4 | 1.8–2.1 | 0.7–0.8 |
| SURFACE ROUGHNESS, Ra (μm) | | |
| Dortran 51 | 0.9 ± 0.2 | 1.6 ± 1 |
| KS4 | 2.7 ± 1.7 | 2.3 ± 0.5 |
| KS2 | 2.2 ± 0.3 | 1.5 ± 0.3 |
| KS1 | 2.4 ± 0.2 | 1.6 ± 0.5 |

Conclusion

The overall performance of the cutting fluids (KS1 and KS2 based on compounds of the formula I is superior to the standard fluid (KS4). The lubricating properties of the two fluids are in several tests similar to the chlorinated mineral oil, Dortan 51. As KS1 and KS2 consist of 95% water, the cooling properties are much better than those of Dortan 51.

EXAMPLE 12

18 g of the product prepared according to example 4 and 2 g of a fatty acid ester based on saturated fatty acids and 2-ethylhexanol were mixed. The mixture was slowly added to 80 g of water while stirring with a magnetic stirrer whereby a transparent emulsion was obtained. This emulsion had excellent properties for use as a mold release agent for polyurethane systems.

EXAMPLE 13

Cold-cycle testing of emulsions

The emulsions prepared in examples 8 and 10 were tested for their ability to withstand repeated freezing/thawing cycles. A sample of app. 20 g was left at −20° C. for 8 hours. Thereafter, the sample was thawed by leaving it at room temperature for 8 hours. The sample was checked for any phase separation and again cooled to −20°; C. A total of 20 such freezing/thawing cycles were performed.

The emulsions from examples 8 and 10 both withstood 20 cycles without any signs of phase separation.

EXAMPLE 14

A 2 liter 3-necked flask equipped with a mechanical stirrer, a thermometer, a Dean-Stark water separating device and inlet for inert gas nitrogen was charged with 507 g (0.5 mole) of ethoxylated trimethylolpropane (TMP) (20 moles ethylene oxide per mole TMP), 196 g (0.333 mole) of dimeric oleic acid, 47 g (0.167 mole) oleic acid. 0.3 g of an alkyl tin carboxylate catalyst (Swedcat 3, Swedstab AB, Sweden) and 30 g of xylene. The xylene was added for the purpose of azeotropic distillation of water formed during the reaction. Under a nitrogen atmosphere, the temperature was raised to the final reaction temperature of 240° C. under formation of water. After the acid number had fallen to below 1 mg of KOH/g, the remaining xylene was distilled off in vacuum.

The product was a viscous oil at 20° C. with an acid number of 0.5 mg of KOH/g.

EXAMPLE 15

The product prepared in example 14 was mixed with dipropylene glycol (DPG), polyethylene glycol 400 monooleate (PEG 400 MO) and dimineralised water according to the following formulation:
20% DPG
1, 2 or 4% PEG 400 MO
4, 6 or 8% product from example 14
Dem. water up to 100%
Kinematic viscosity was measured at 40° C.:

| | Viscosity, cSt/40° |
|---|---|
| 4% ester, 1% PEG 400 MO | 11.1 |
| 8% ester, 2% PEG 400 MO | 78.6 |
| 3% ester, 2% PEG 400 MO | 17.2 |
| 6% ester, 4% PEG 400 MO | 130 |

The viscosity data show that an ISO VG 46 hydraulic fluid can be formulated using only 5–10% ester/emulsifier mixture. This amount of thickener is substantially less than the amount necessary in traditional PEG/PPG-thickened fluids.

EXAMPLE 16

A 2 liter 3-necked flask equipped with a mechanical stirrer, a thermometer, a Dean-Stark water separating device and inlet for inert gas was charged with 608 g (0.6 mole) of ethoxylated trimethylolpropane (20 moles ethylene oxide per mole TMP), 56 g (0.2 mole) of oleic acid, 73 g (0.5 mole) of adipic acid and 30 g of xylene. The temperature was raised to the final reaction temperature of 240° C. After the acid number had fallen to below 10 mg of KOH/g, the remaining xylene was distilled off in vacuum.

The raw product was a thick oil at 20° C. with an acid number of 9.5 mg of KOH/g. The acid number was neutralized with 2.6 g of triethanolamine per 100 g of raw product. The final product was a viscous oil as 20° C.

The product was soluble in 5% aqueous sodium chloride solution with good thickening properties, and the product may therefore be used in oilfield drilling fluids.

As it will be evident from the starting materials used, the product consists of 6 units of ethoxylated TMP (20 moles of ethylene oxide per mole of TMP) linked by 5 units of adipic acid units with about 75% of the remaining alcohol functions esterified with oleic acid.

We claim:

1. A compound of the formula I

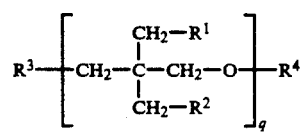

wherein
$R^1$ is hydrogen, $C_{1-4}$ alkyl or a group of the formula II

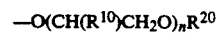

$$-O(CH(R^{10})CH_2O)_nR^{20} \qquad II$$

where $R^{10}$ is hydrogen or $CH_3$, $R^{20}$ is hydrogen or an acyl moiety of a mono- or polycarboxylic acid, and n is an integer from 0 to 15;

$R^2$ is hydrogen or a group of the formula III $$—O(CH(R^{11})CH_2O)_m R^{21} \quad \text{III}$$

where $R^{11}$ is hydrogen or $CH_3$, $R^{21}$ is hydrogen or an acyl moiety of a mono- or polycarboxylic acid, and m is an integer from 0 to 15;

$R^3$ is a group of the formula IV $$—O(CH(R^{12})CH_2O)_p R^{22} \quad \text{IV}$$

where $R^{12}$ is hydrogen or $CH_3$, $R^{22}$ is hydrogen or an acyl moiety of a mono- or polycarboxylic acid, and p is an integer from 0 to 15; and $R^4$ is a group of the formula V $$—(CH(R^{13})CH_2O)_l R^{23} \quad \text{V}$$

where $R^{13}$ is hydrogen or $CH_3$, $R^{23}$ is an acyl moiety of a polycarboxylic acid, and r is an integer from 1 to 15;

q is 1 or 2;

with the proviso that is q is 2, then the 2 groups $R^1$ may be the same or different and the 2 groups $R^2$ may be the same or different;

and wherein any two, three or four acyl groups, $R^{20}$, $R^{21}$, $R^{22}$ or $R^{23}$ in any two, three or four units of formula I can be formed from two, three or four carboxyl groups of the same polycarboxylic acid; and at least one of any free carboxylic acid groups is neutralized.

2. A compound according to claim 1 in which n, m, p, or r each independently is an integer from 1 to 10.

3. A compound according to claim 2 in which n, m, p, or r each independently is an integer from 1 to 7.

4. A compound according to claim 1 in which the acyl moiety of a monocarboxylic acid group is the acyl moiety of a monocarboxylic acid selected from the group consisting of $C_{1-24}$ alkanoic acids optionally substituted with 1 or 2 hydroxy groups, $C_{3-24}$ alkenoic acids optionally substituted with 1 or 2 hydroxy groups, $C_{5-24}$ alkadienoic acids optionally substituted with 1 or 2 hydroxy groups, and arylcarboxylic acids where the aryl moiety may be substituted with hydroxy or $C_{1-4}$ alkyl.

5. A compound according to claim 1 in which the acyl moiety of a polycarboxylic acid is an acyl moiety of a polycarboxylic acid having 2-4 carboxy groups.

6. A compound according to claim 1 in which any free carboxylic groups are neutralized with a base.

7. A compound according to claim 6 in which the base is an alkaline or alkaline earth metal hydroxide or carbonate, ammonia or an organic amine.

8. A compound according to claim 1 in which
1) $R^1$ and $R^2$ are both hydrogen,
2) $R^1$ is methyl and $R^2$ is the group of the formula III, or
3) $R^1$ is a group of the formula II and $R^2$ is a group of the formula II.

9. A composition consisting of one or more compounds of the formula I as defined in claim 1 and one or more additives.

10. A composition according to claim 9 in which the additive(s) is/are selected from the group consisting of corrosion inhibitors, oily hydrophobic components, biocides, or EP/AW agents.

11. An aqueous emulsion of one or more compounds of the formula I as defined in claim 1.

12. An emulsion according to claim 11 in which the total content of the compound or compounds of the formula I is in the range from 0.1 to 90 percent by weight.

13. An emulsion according to claim 12 in which the total content of the compound or compounds of the formula I is in the range from 0.5 to 50 percent by weight.

14. An emulsion according to claim 13 in which the total content of the compound or compounds of the formula I is in the range from 1.0 to 35 percent by weight.

15. An emulsion according to claim 14 in which the total content of the compound or compounds of the formula I is in the range from 1.0 to 20 percent by weight.

16. A method of cooling and lubricating a metal or plastic item during a machining operation, comprising applying to a machining site of said item, during said machining operation, a compound of the formula I as defined in claim 1.

17. A method of transmitting hydraulic pressure through a hydraulic conduit by means of a hydraulic transmission fluid contained in said conduit, wherein said hydraulic transmission fluid is a compound of the formula I as defined in claim 1.

18. A method of casting an item from a castable material in a mould, wherein a mould release agent is introduced into said mould prior to the introduction of said castable material into said mould and wherein said mould releasing agent is a compound of the formula I as defined in claim 1.

19. An aqueous emulsion of a composition as defined in claim 9.

20. A method of cooling and lubricating a metal or plastic item during a machining, comprising applying to a machining site of said item, during said machining operation, a composition of the formula I as defined in claim 9.

21. A method of cooling and lubricating a metal or plastic item during a machining, comprising applying to a machining site of said item, during said machining operation, an emulsion of the formula I as defined in claim 11.

22. A method of transmitting hydraulic pressure through a hydraulic conduit by means of a hydraulic transmission fluid contained in said conduit, wherein said hydraulic transmission fluid is a composition of the formula I as defined in claim 9.

23. A method of transmitting hydraulic pressure through a hydraulic conduit by means of a hydraulic transmission fluid contained in said conduit, wherein said hydraulic transmission fluid is an emulsion of the formula I as defined in claim 11.

24. A method of casting an item from a castable material in a mould, wherein a mould release agent is introduced into said mould prior to the introduction of said castable material into said mould and wherein said mould releasing agent is a composition of the formula I as defined in claim 9.

25. A method of casting an item from a castable material in a mould, wherein a mould release agent is introduced into said mould prior to the introduction of said castable material into said mould and wherein said mould releasing agent is an emulsion as defined in claim 11.

26. A compound according to claim 1, wherein the acyl moiety of a polycarboxylic acid is an acyl moiety of a polycarboxylic acid selected from the group consisting of $C_{2-20}$ alkenedioic acids optionally substituted with 1 or 2 hydroxy groups, $C_{4-20}$ alkenedioic acids, $C_{6-20}$ alkadienedioic acids, $C_{6-20}$ alkanetroic acids optionally substituted with 1 or 2 hydroxy groups, aryldicarboxylic acids, aryltricarboxylic acids, aryltetracarboxylic acids, and di- or tri- meric fatty acids produced by polymerization of unsaturated fatty acids with 8–20 carbon atoms, preferably 16–18 atoms.

* * * * *